D. B. WILLIAMS.
AUTOMATIC WEIGHING APPARATUS.
APPLICATION FILED NOV. 23, 1915.
1,222,913.
Patented Apr. 17, 1917.
2 SHEETS—SHEET 2.
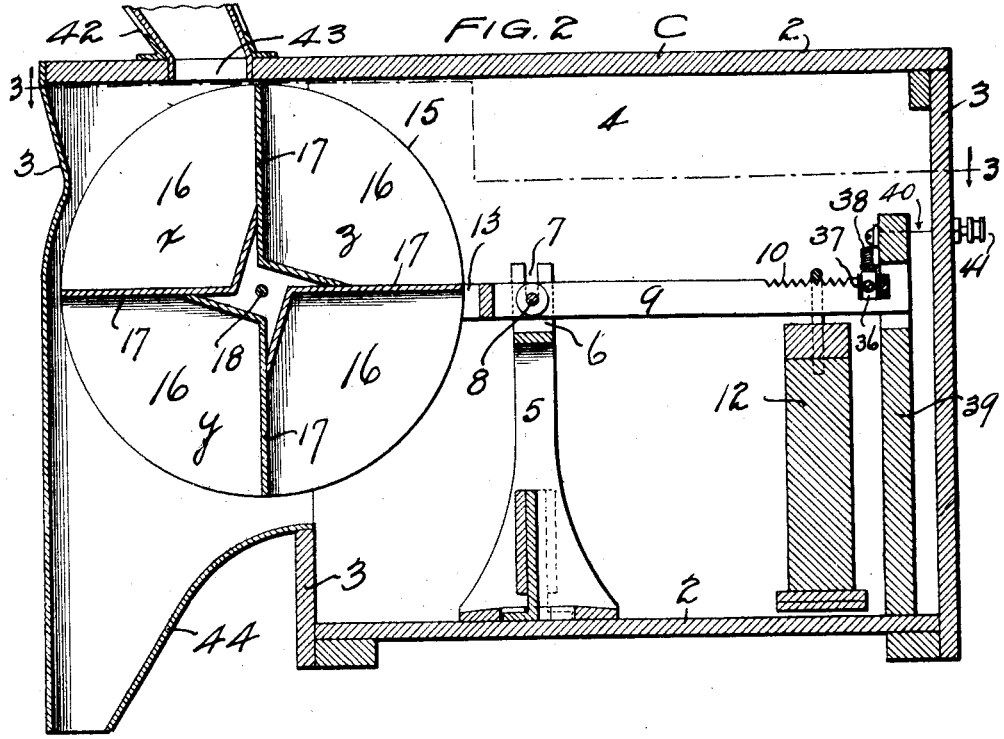
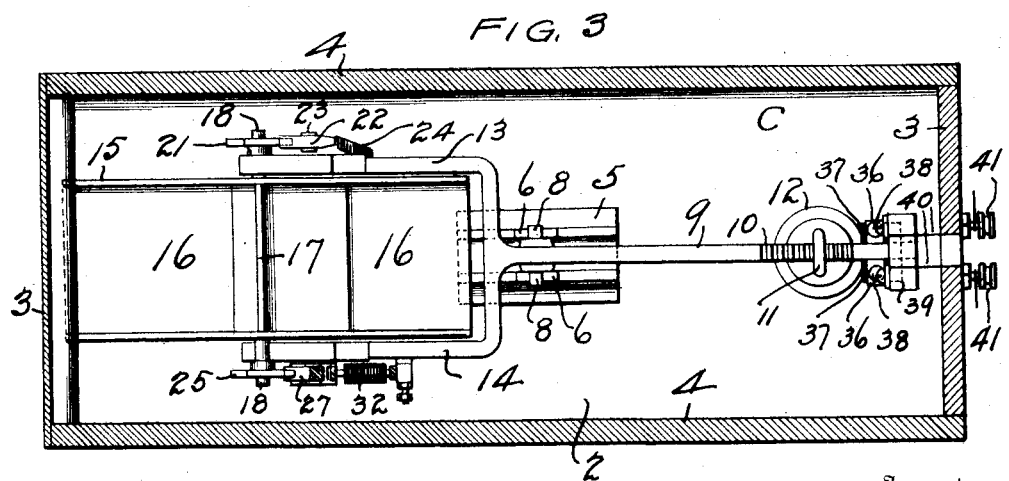
Inventor
DICK B. WILLIAMS
Witness

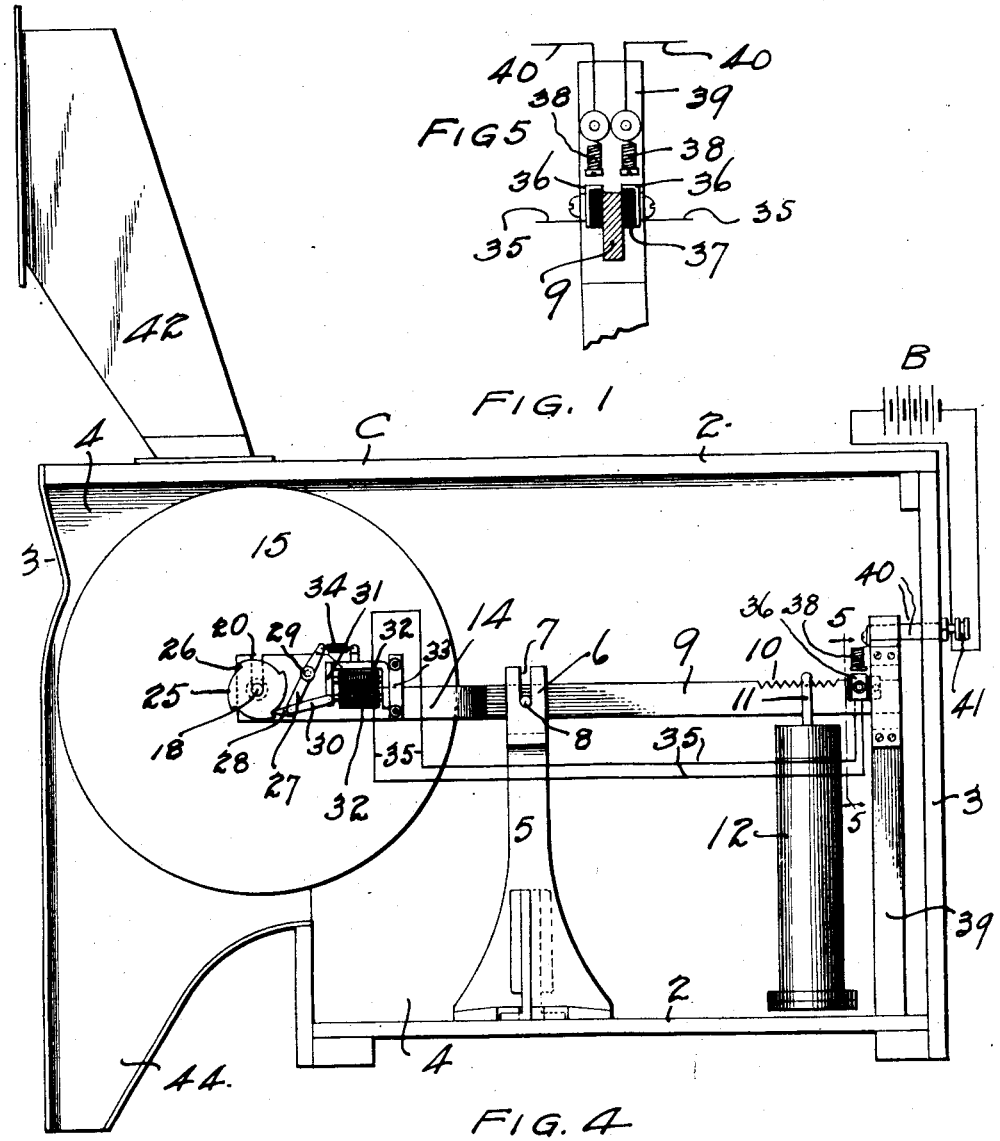

UNITED STATES PATENT OFFICE.

DICK B. WILLIAMS, OF NEW ORLEANS, LOUISIANA, ASSIGNOR TO LOUISIANA NUT AND PRODUCE COMPANY, OF NEW ORLEANS, LOUISIANA, A CORPORATION OF LOUISIANA.

AUTOMATIC WEIGHING APPARATUS.

1,222,913.  Specification of Letters Patent.  Patented Apr. 17, 1917.

Application filed November 23, 1915. Serial No. 63,053.

*To all whom it may concern:*

Be it known that I, DICK B. WILLIAMS, a citizen of the United States, residing at New Orleans, in the parish of Orleans and State of Louisiana, have invented certain new and useful Improvements in Automatic Weighing Apparatus, of which the following is a specification.

This invention relates in general to measuring instruments, and more particularly to a novel improvement in automatic weighing machines of the type that are electrically controlled.

Primarily, the invention has in view a device that is especially adapted to accurately and automatically weigh shelled nut meats for packaging in predetermined quantities, and to this end contemplates a simple and practical device that is reliable and positive in its operation.

Another object of the invention is to provide a novel arrangement of weighing receptacle and scale beam, whereby the former automatically discharges when filled to a required and predetermined weight through the action of electrically operated check means, and at the same time provides for the reception of another and succeeding or following quantity of material to be weighed.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the acompanying drawings, in which—

Figure 1 is a side elevation of the apparatus with one of the side plates of the casing removed.

Fig. 2 is a longitudinal sectional view.

Fig. 3 is a horizontal sectional view on the line 3—3 of Fig. 2.

Fig. 4 is a detail elevational view of the check pawl.

Fig. 5 is a detail sectional view on the line 5—5 of Fig. 1.

Similar reference characters designate corresponding parts throughout the several figures of the drawings.

In carrying out the present invention, it is preferred to employ a scale housing or casing C, having the top and bottom walls, end walls 3, and side walls 4, which may be of any desired dimensions to suit the size and capacity of the weighing apparatus. This casing serves to keep the weighing device free from dust and other foreign matter, and furthermore, provides a clean weighing chamber.

As will be clear from Fig. 1, one of the side walls 4 have been removed to expose the weighing apparatus, which essentially comprises a supporting standard 5 having a bifurcated end portion 6 provided with the slots 7 for receiving the fulcrum pin 8 of the scale beam 9. This scale beam is preferably formed at one end with a plurality of graduated notches 10 which receive the loop 11 of the counterweight or balance 12. The end of the scale beam opposite the weight 12 is preferably of forked or yoke formation, thus providing the supporting arms 13 and 14 for carrying a rotatable weighing and delivering drum 15.

This drum 15 contains a plurality of weighing pockets 16 which are formed by the radially disposed partition walls 17, and is also provided with an axle member 18, one end of which is fitted into an opening 19 in the yoke arm 13, while the other end drops into a slot 20 on the arm 14. This axle member carries at the end which fits into the hole 19 a check device for preventing the backward rotation of the drum, which essentially comprises a ratchet disk 21 and a pawl 22 pivoted on the arm 13 as at 23, and caused to engage the teeth of the ratchet 21 by means of a spring 24. The opposite end of the axle 18, that is, the end which is journaled in the arm 14 is provided with a ratchet disk 25 which forms a part of an automatic releasing device for permitting the drum to turn forward after one of the pockets thereof has received its predetermined load. This ratchet disk 25 is preferably provided with as many stop elements 26 as there are pockets in the drum. In the present case, four pockets are shown, although it will of course be understood that the number may be increased or diminished as desired.

The ratchet disk 25 above referred to coöperates with an electrically actuated check pawl 27 having a foot 28 for engaging the stop elements 26 of the said disk. This pawl 27 is pivoted as at 29 to the arm 14 of the yoke, and is connected by means of a link 30 with an armature member 31 that is controlled by means of the fixed electromagnets 32. The said magnets 32 are suitably supported in a framework 33 on the arm 14, and when energized draw the armature 31 so that the pawl 27 is turned on its pivot 29 to remove the foot 28 from engagement with one of the stop elements 26 of the ratchet disk 25, against the tension of the spring 34.

With further reference to the magnets 32, it will be observed that the same are provided with suitable wiring connections 35 which lead to the circuit closer elements 36 on the end of the scale beam 9. These circuit closer elements 36 are insulated from the beam 9 by suitable insulation 37, shown more clearly in Fig. 5, and when the scale beam is tilted by the pocket of the drum becoming filled, the end of the beam having these elements rises and strikes against the fixed contact elements 38 carried upon a trig standard 39. The said contacts 38 have electrical connections 40 with the battery terminal pieces 41 which are suitably connected with a battery B or other source of electrical energy.

In connection with the drum 15 and the arrangement of the pockets 16 therein, it will be observed from Fig. 2 that these pockets are so arranged that one of them is adapted to receive nut meats fed into the casing C by the spout 42 and through the opening 43, while another one is adapted to directly discharge into the delivery spout 44. As will be clear from Fig. 2, the arrangement of the partition walls 17 is such that the material to be weighed coming through the opening 43 can only fill the pocket directly beneath the same, as for instance, the one having the position designated as $x$ in Fig. 2. When this pocket has received its load, and the scale beam tilts, the electric circuit is closed so that the pawl 27 releases ratchet disk 25 to permit the pocket to rotate by gravity into the position of the pocket $y$, Fig. 2, and thus discharge. However, it will be noted that as the pocket at position $x$ begins to rotate toward the pocket in position $y$, the wall 17 thereof will pass across the mouth of the opening 43 and act as a cutoff to prevent further material from the spout 42 entering the pocket at $x$, and directing the same into the next pocket, as for instance the pocket at $z$. It will of course, be apparent that the momentum of the filled chamber going from its receiving position to its discharging position will be sufficient to completely bring the following or succeeding unfilled pocket into proper position for receiving the supply of material to be weighed from the spout 42. Furthermore it will be noted that owing to the pawl and ratchet device 21—22 being reversely related to the pawl and ratchet device 25—27, a pocket being filled will be prevented from turning backward and throwing the contents thereof back into the casing C.

With reference to the manner of operation, it will be obvious from the foregoing description that the counter-weight 12 may be set so that the beam will operate under a predetermined load, as for instance one pound. In the normal condition of the apparatus, the foot 28 of pawl 27 engages with the ratchet disk 25 to prevent forward movement of the drum 15, while the pawl 22 engages the ratchet disk 21 to prevent backward movement of the drum. Thus, when the material to be weighed is fed into the casing C through the spout 42, the same enters the one of the pockets 16 directly beneath the opening 43 and fills the same to capacity, and when the capacity point is reached, the yoke end of the beam 9 drops, carrying the weight end upward. As the weight end rises, the circuit closer elements 36 strike the contacts 38, and thus close the circuit through the wires 35 to magnets 32, which draw back the armature 31 and pull the foot 28 of pawl 27 out of engagement with the disk 25, against the tension of spring 34. When the pawl 27 is disengaged from the disk 25, the drum is free to rotate by gravity to discharge the weighed contents of one of its pockets. As soon as the contents of the pocket is discharged, the counterweight 12 draws the contact end of the beam down, and thus breaks the electrical circuit, deënergizing the magnets and permitting the spring 34 to thrust the foot 28 of the pawl 27 into engagement with the stop elements 26 of the ratchet disk 25. This operation is repeated each time one of the pockets 16 is filled to capacity.

It is thought that the many features and advantages of the invention will be apparent without further description, and it will of course be understood that changes in the form, proportion, and minor details of construction may be resorted to without departing from the spirit of the invention or scope of the appended claims.

I claim:

1. An automatic weighing apparatus comprising a casing, a balanced scale beam having a yoke at one end, a rotatable weighing and delivery drum having a plurality of weighing compartments mounted in said yoke and including an axle having at each end thereof reversely disposed ratchet disks, a magnetically controlled check pawl carried by said yoke and normally engaging one of said ratchet disks to prevent movement of the drum in a forward direction, and a spring tensioned pawl arranged reversely to the magnetically controlled pawl to engage with the other of said disks to prevent backward movement of the drum, and electrical means for controlling said magnetically controlled check pawl.

2. An automatic weighing apparatus comprising a casing, a balanced scale beam having a yoke at one end, a rotatable weighing and delivery drum, having a plurality of weighing compartments, mounted in said yoke and including an axle having reversely arranged ratchet disks at each end thereof, spring-tensioned pawls for engaging said ratchet disks, and electrical means for operating the pawl which checks the forward movement of the drum comprising a magnet device carried by said yoke and having a link connection with the pawl, circuit-closing contacts at the end of said beam opposite the drum, permanent battery contacts carried by the casing, and electrical connections between said beam contacts and said magnet device.

3. An automatic weighing apparatus comprising a casing having an inlet at its upper side and a downwardly directed delivery spout at its bottom side, a rotatable weighing and delivery drum arranged between said feed inlet and delivery spout, a scale beam for supporting said drum, pawl and ratchet means for controlling said rotatable drum, magnetic means carried by said beam for operating one of said pawls, circuit-closing contacts at the end of said beam opposite the drum, fixed contacts carried by the casing and connected with a source of electrical energy, and electric connection between said beam circuit closers and said magnetic means.

4. An automatic weighing apparatus comprising a casing, a support stationary within the casing, a balanced scale beam having a forked end portion and laterally disposed fulcrum lugs located at one side of the forked end and having a bearing in said stationary support, a weighing and delivery drum rotatably supported in said forked end, an axle for said drum having reversely disposed ratchet disks at each end thereof, spring-tensioned pawls for each disk, a magnet device for actuating one of said pawls to permit the drum to rotate forward under a predetermined weight, and electrical means for operating said magnet device to permit rotation of the delivery drum.

5. An automatic weighing apparatus including a balanced scale beam having a forked end portion, a weighing and delivery drum having an axle rotatably supported in said forked end, reversely disposed check disks carried by each end of said axle, spring-tensioned pawls disposed in reversed relation for said disks, a magnet device carried by said forked end portion and operatively connected with one of said spring-tensioned pawls, separate circuit-closing elements carried by each side of the scale beam at the weight end thereof, separate battery terminal contacts arranged in the path of movement of said circuit-closing elements on the beam, and electrical connections between said circuit-closing elements and said magnet device.

In testimony whereof I hereunto affix my signature in the presence of two witnesses.

DICK B. WILLIAMS.

Witnesses:
M. Eagan,
L. P. O'Dowd.

Copies of this patent may be obtained for five cents each, by addressing the "Commissioner of Patents, Washington, D. C."